United States Patent [19]
Ito et al.

[11] Patent Number: 4,811,328
[45] Date of Patent: Mar. 7, 1989

[54] OPTICAL RECORDING AND REPRODUCING DEVICE

[75] Inventors: Tetsuo Ito, Mito; Hiroshi Sasaki, Hitachi; Yoshio Sato, Hitachi; Satoshi Shimada, Hitachi; Norifumi Miyamoto, Hitachi; Nobuyoshi Tsuboi, Ibaraki; Hideki Nihei; Hiroaki Koyanagi, both of Hitachi, all of Japan

[73] Assignee: Hitachi, Ltd., Tokyo, Japan

[21] Appl. No.: 803,611

[22] Filed: Dec. 2, 1985

[30] Foreign Application Priority Data

Dec. 3, 1984 [JP] Japan .................. 59-255317

[51] Int. Cl.$^4$ .................................... G11B 7/00
[52] U.S. Cl. ................... 369/112; 369/122; 369/44; 350/170
[58] Field of Search .......... 350/169, 170, 174, 286; 369/112, 122, 44

[56] References Cited

U.S. PATENT DOCUMENTS

| 3,736,046 | 5/1973 | Zook | 346/76 L X |
|---|---|---|---|
| 3,983,317 | 9/1976 | Glorioso | 369/112 X |
| 4,125,860 | 11/1978 | Ishii et al. | 369/112 X |
| 4,149,773 | 4/1979 | Reid | 350/170 X |
| 4,545,651 | 10/1985 | Kato et al. | 350/174 X |
| 4,564,931 | 1/1986 | O'Hara et al. | 369/122 X |
| 4,566,088 | 1/1986 | Yoshida et al. | 369/122 X |
| 4,623,225 | 11/1986 | Forkner | 350/286 X |

FOREIGN PATENT DOCUMENTS

| 52-149927 | 12/1977 | Japan | 369/122 |
|---|---|---|---|
| 58-83347 | 5/1983 | Japan | 369/13 |
| 59-71140 | 4/1984 | Japan | . |

*Primary Examiner*—Aristotelis M. Psitos
*Attorney, Agent, or Firm*—Antonelli, Terry & Wands

[57] ABSTRACT

A laser light flux is divided and synthesized so that its light intensity distribution is changed from a Gaussian distribution to a non-Gaussian distribution. When a laser light flux having a Gaussian distribution is irradiated onto a dividing prism, it is divided into a left part and a right part which are refracted right and left inversely from each other. When the right and left parts are incident on a synthesizing prism, they are refracted again and travel to be overlapped with each other on a recording medium. The light intensity distribution on a segment at the apex of the synthesizing prism is weaker at the central part and stronger at the peripheral part. This is because the light fluxes resulting from the division are inverted in their position so that the central part of the Gaussian distribution is separated left and right while the peripheral part with a weaker light intensity is centered.

16 Claims, 9 Drawing Sheets

OPTICAL RECORDING AND REPRODUCING DEVICE

BACKGROUND OF THE INVENTION

This invention relates to an optical recording and reproducing device which permits signals to be recorded and reproduced on an optical medium with a high density by irradiating a laser light or the like with its flux converged into a minute spot onto the optical medium and permits the signals once recorded to be erased. More particularly it relates to an optical recording and reproducing device suited to erase information at a high speed.

In such a kind of conventional devices, the light flux of the laser light or the like irradiated onto an optical recording medium provided, as disclosed in Japanese Patent Unexamined Publication No. 59-71140, has a substantially circular or elliptic shape and a "Gaussian" light intensity distribution where the light intensity is highest at its center and exponentially attenuates towards its periphery. The Gaussian light intensity distribution on the optical recording medium resulted in a Gaussian temperature distribution there, and this gave rise to several difficulties.

FIG. 1 shows a temperature distribution 28 on an optical recording medium in the conventional devices. The abscissa indicates a position of an optical recording medium, and the ordinate indicates the temperature at the position irradiated with the Gaussian light flux. In this figure, it is necessary to maintain the temperature between $T_1$ and $T_2$ in order to erase the signals recorded on the medium assuming that $T_1$ is an erasable minimum temperature and $T_2$ is an erasable maximum temperature which means a writable minimum temperature. Moreover, although the temperature for writing must be higher than $T_2$, it should be also controlled within an implicit upper limit $T_3$ for the protection of recording mediums.

Thus, it is troublesome and difficult to control the temperature for writing and reproduction. For example, when the information recording in a position range of $X_1-X_4$ is intended, the temperature distribution 28 does not permit the recording in ranges of $X_1-X_2$ and $X_3-X_4$ whereas a possible temperature distribution 28-1 may destroy the medium because of its high temperature. On the other hand, when the information erasing is intended in the range of $X_1-X_4$, the temperature distribution 28 does not permit the erasing in a range of $X_2-X_3$ but leaves the information there. For these reasons, it has been proposed to individually provide laser light sources for recording and reproducing but it is still difficult to solve the above problem.

SUMMARY OF THE INVENTION

Accordingly, it is an object of this invention to provide an optical recording and reproducing device which provides a temperature distribution on a recording medium which is suitable to record and reproduce information.

In order to attain this object, in accordance with this invention, a laser light flux with a Gaussian light intensity distribution where the light intensity is highest at its center and attenuates toward its periphery is divided and synthesized to form a non-Gaussian light intensity distribution so that the reversible change of a recording medium at a light irradiating part is made easy and speedy to erase information at a high speed.

DESCRIPTION OF THE PREFERRED EMBODIMENTS

Figure 1:
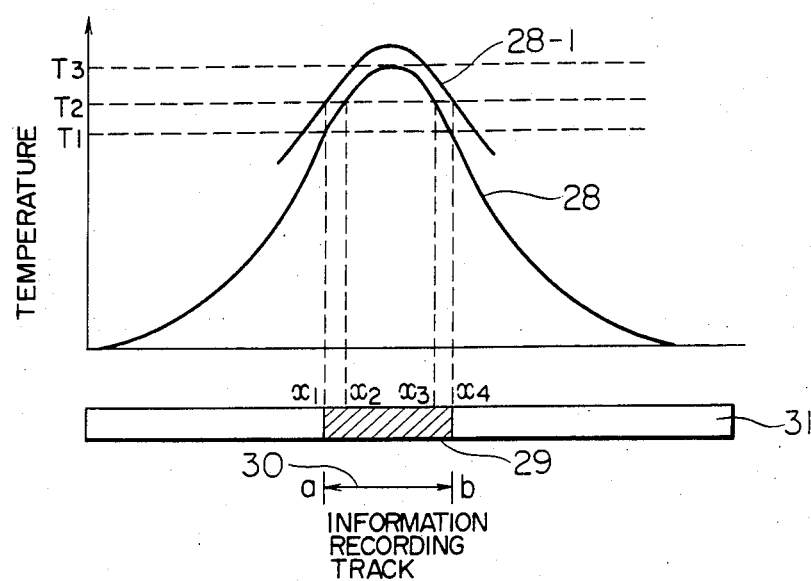
FIG. 1 is a view showing a temperature distribution on a recording medium in conventional recording and reproducing devices.
Figure 2:
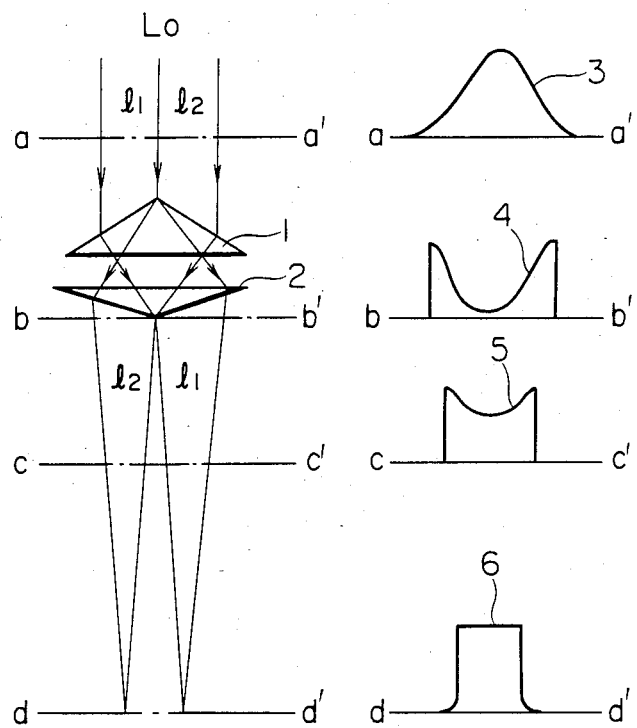
FIG. 2(a) through (d) depicts a view for explaining the basic idea of this invention of providing a non Gaussian distribution light flux from a Gaussian distribution light flux.

Referring now to FIG. 2, explanation will be given for the basic idea of this invention wherein a laser light flux is divided and synthesized so that its light intensity distribution is changed from a Gaussian distribution to a non-Gaussian distribution. When a laser light flux $L_0$ having a Gaussian distribution indicated by 3 is irradiated onto triangle prism 1, it is divided into a left light flux portion $l_1$ and a right light flux portion $l_2$ which are refracted right and left inversely from each other. When the light fluxes $l_1$ and $l_2$ divided left and right are incident on another triangle prism 2, they are refracted again and travel to be overlapped with each other on a segment dd'.

The light intensity distribution on a segment bb' at the apex of the prism 2 is weaker at the central part and stronger at the peripheral part as illustrated by 4. This is because the light fluxes $l_1$ and $l_2$ are inverted in their position so that the central part of the Gaussian distribution 3 is separated left and right while the peripheral part with a weaker light intensity is centered.

The light intensity distribution on a segment cc' at a position apart from the apex of the prism 2 results as indicated by 5. At this position, the light fluxes $l_1$ and $_2$ are overlapped at the central part of the distribution to provide a stronger light intensity there than that of the distribution 4. Then, the entire light flux width thus formed is narrower than that of the distribution 4.

The light fluxes $l_1$ and $l_2$ almost completely overlapped with each other on the segment dd' provides an even light intensity distribution as indicated by 6.

Thus, the laser light flux is divided and synthesized by the dividing prism 1 and the synthesizing prism 2 so as to convert the Gaussian distribution into the non-Gaussian distribution.

Figure 3:
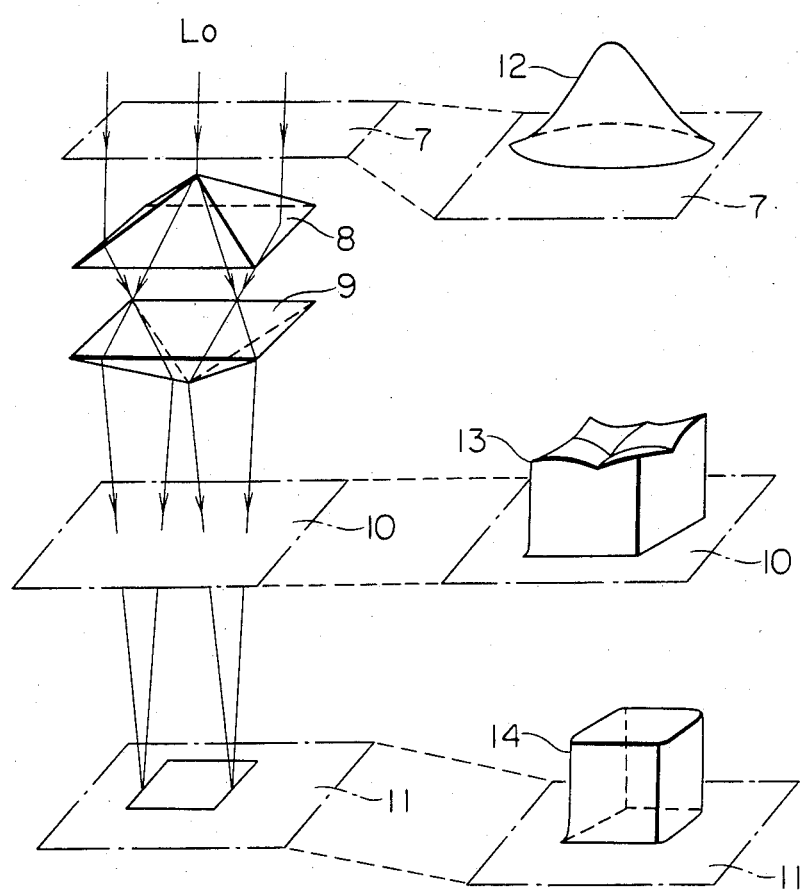
FIG. 3 is a view showing one embodiment of this invention wherein to realize the basic idea of this invention shown in FIG. 2, a quadrangular pyramid prism is used as a light flux dividing prism while another quadrangular pyramid prism is used as a light flux synthesizing prism.

In order realize the basic idea as mentioned above, in one embodiment of this invention as shown in FIG. 3, a quadrangular pyramid prism 8 is used as a light flux dividing prism and another quadrangular pyramid prism 9 is used as a light flux synthesizing prism. A light flux $L_0$ incident to the quadrangular pyramid prism 8 provides, as indicated by 12, a light intensity distribution on a plane 7 where the light intensity is stronger at its central part and attenuates towards its periphery (i.e. two-dimentional Gaussian distribution). When this light flux $L_0$ is incident on the quadrangular pyramid prism 8, it is divided into four light flux parts, which are refracted, travel and are incident on the light flux synthesizing prism 9, respectively. This light flux synthesizing prism 9 serves to refract the four-divided light flux parts so as to be overlapped again and to synthesize them into one light flux on a plane 11. The light intensity distribution on the plane 11 provides, as indicated by 14, an even quadrangular prism shape. Incidentally, the light intensity distribution on a halfway plane 10 is, as indicated by 13, one where the light intensity at its central part is weaker than that in its peripheral part since the four-divided light fluxes are not completely overlapped.

Although in this embodiment, quadrangular prisms are used as a light flux dividing/synthesizing prism, a polyangular pyramid such as a pentangular pyramid and a hexangular pyramid can be used in a like manner. In this case, the resultant light intensity distribution provides a polyangular pyramid prism such as a pentangular prism or a hexangular prism.

Figure 4:
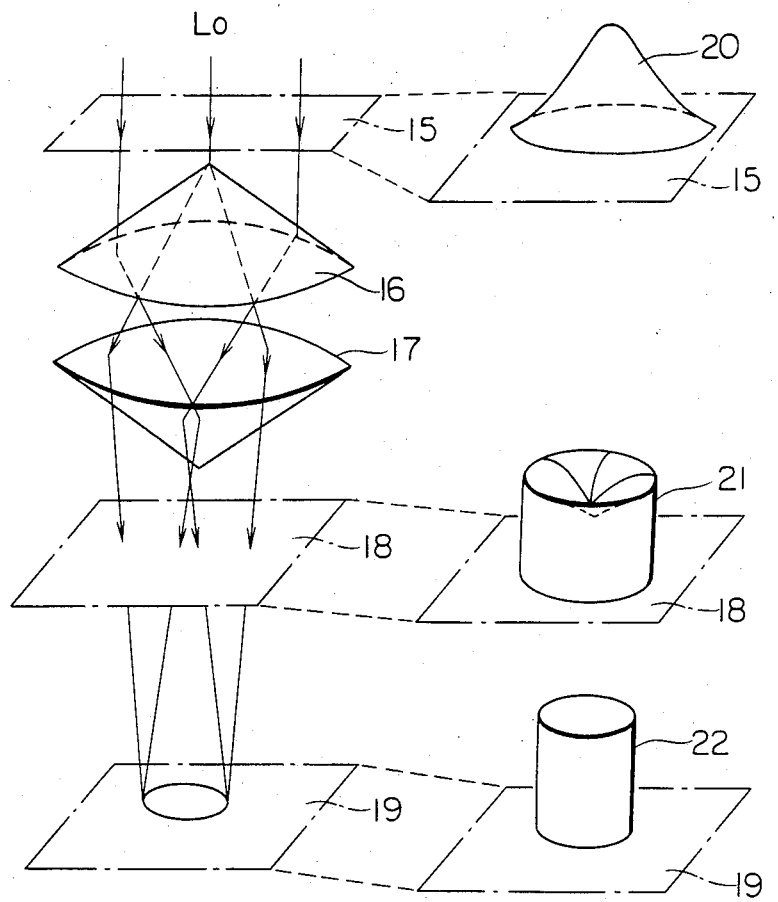
FIG. 4 is a view showing another embodiment of this invention wherein to realize the basic idea of this invention shown in FIG. 2, cone prisms are used as a light flux dividing prism and a light flux synthesizing prism, respectively.

FIG. 4 shows another embodiment of this invention. In this embodiment, a cone prism is used as a light flux dividing/synthesizing prism. A light flux $L_0$ incident to a conical dividing prism 16 provides a two-dimentional Gaussian light intensity distribution on a plane 15 as shown by 20. When this light flux is incident on the dividing prism 16, it is divided and refracted anywhere on the incident plane, and is incident on a conical synthesizing prism 17. The function of this conical prism is easy to understand by considering it to be a polyangular pyramid prism with an unlimited number of apexes on its bottom.

Now, the light fluxes refracted at the synthesizing prism 17 are overlapped with each other in any direction on a plane 19, and provides a column shape light intensity distribution there as shown by 22. Also, on a plane 18 they provide a light intensity distribution with a weaker intensity at its central part as shown by 21 since they are not entirely overlapped there. An elliptical cone prism may be used as a dividing/synthesizing prism.

Figure 5A:
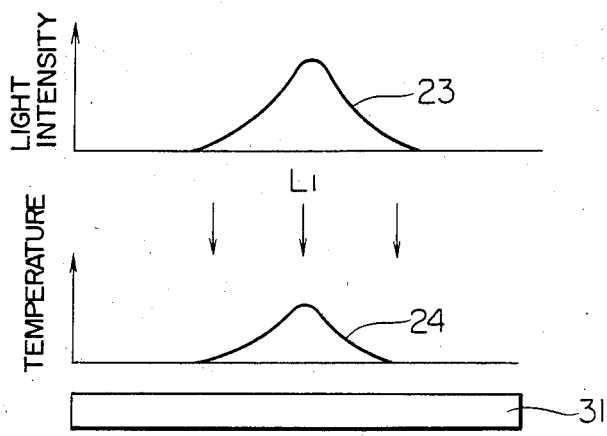
FIGS. 5a and 5b, and 6 are views for explaining advantages when using an even distribution light flux.
Figure 5B:
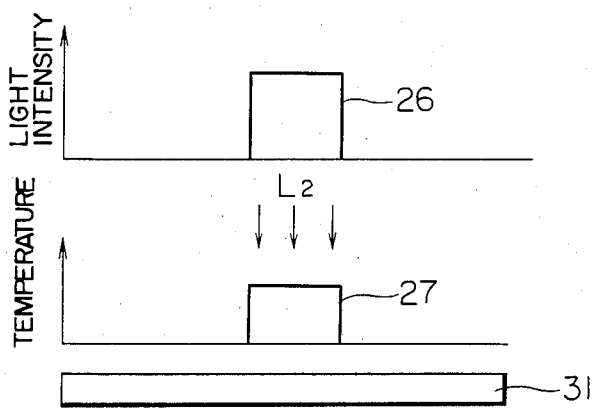

Explanation will be made on the advantages of the light intensity distribution of a light flux being not a Gaussian distribution but an even distribution within the flux. When a light flux having a Gaussian distribution as shown by 23 in FIG. 5a is irradiated onto an optical recording medium (optical disk) 31, it provides a Gaussian temperature distribution of the optical recording material formed on the optical recording medium, as shown by 24, where the temperature is the highest at its center and attenuates towards its periphery and a great temperature difference exists. On the other hand, the light flux having an even light intensity distribution as shown by 26 in FIG. 5b provides, within the flux, an even temperature distribution of the optical recording material formed on the optical recording medium 31 as shown in 27 in FIG. 5b.

Meanwhile, as mentioned above, in order to erase the information recorded on an optical recording material or newly write information, it is necessary to increase the temperature of the material to the erasing temperature (range between $T_1$ and $T_2$ shown in FIG. 6) or the recording temperature (range between $T_2$ and $T_3$ shown in FIG. 6) which is specific to the material.

Figure 6:
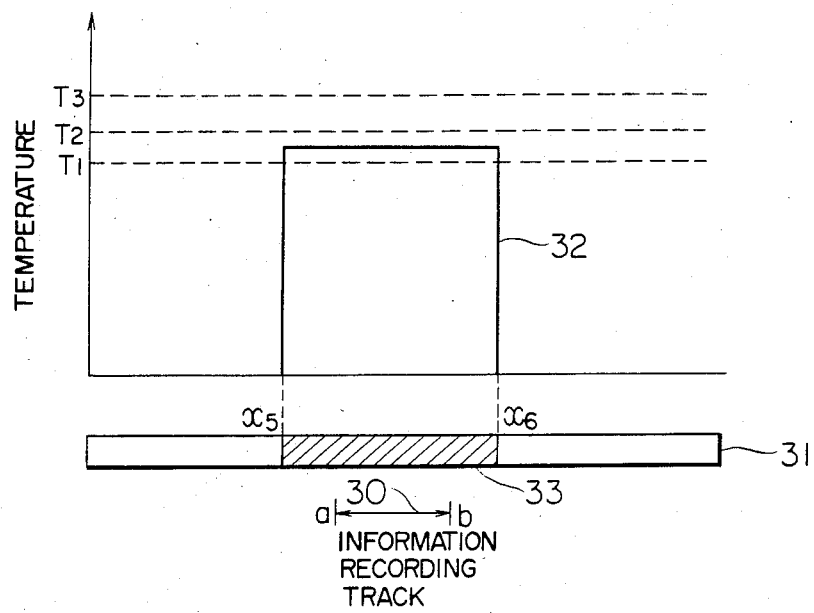

To this end, forming an even light intensity distribution b using light flux dividing and synthesizing prisms provides, within the flux, a fixed or even temperature distribution of the optical recording material formed on the optical disk 31, as shown by 32 in FIG. 6, thus enabling to set the same erasing temperature (between $T_1$ and $T_2$) or writing temperature at a part 33 between the points $X_5$ and $X_6$ on the optical disk. Thus, a fixed temperature between $T_1$ and $T_2$ can be set at any portion of an information recording track 30. Therefore, by maintaining this fixed temperature for a certain period, the information recorded on the information recording track 30 can be simultaneously erased. In this case, it is not necessary to gradually decrease the light flux intensity so that an additional advantage of greatly reducing the time required for erasing is provided.

Figure 7:
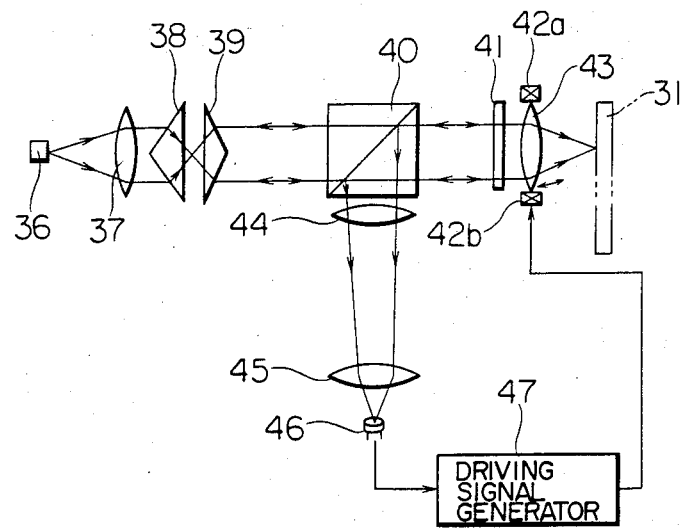
FIGS. 7 to 11 are views showing embodiments of this invention wherein a light flux dividing prism and a light flux synthesizing prism are incorporated in an optical system of an optical recording and reproducing device, respectively.

FIG. 7 shows an embodiment of this invention wherein an optical flux dividing prism 38 and an optical flux synthesizing prism 39 are incorporated in an optical system of the optical recording and reproducing device. In this figure, the laser light flux radiated from a semiconductor laser 36 is collimated by a collimator lens 37, incident on the light flux dividing prism 38 and divided there. The light fluxes resulting from the division are synthesized through overlapping by the light flux synthesizing prism 39, which results in an even light intensity of the light flux. The evened light flux passes through a polarized-light beam splitter 40 and a ¼ wavelength plate 41 to provide a circular-polarized light flux. This light flux is converged into a minute spot by a projecting lens 43 and this spot is irradiated onto the optical disk 31. The optical recording medium formed on the optical disk 31 absorbs this light and is heated.

Then, suitably adjusting the light intensity of the laser light flux enables to record, erase or reproduce information. Generally, when recording information on the optical disk 31, the optical recording medium is heated and abruptly cooled, and when erasing the information, it is heated to its erasing temperature and maintained at the temperature for a certain period. When reproducing the information, a weak light is irradiated onto the optical disk 31, and the reflected light is detected to read out the recorded information. Since the information has been recorded with differences of the reflecting index, detecting the intensity of the reflected light allows to read out the recorded information.

Further, when recording, erasing or reproducing information in the above-mentioned manner, the spot light must be irradiated onto the optical disk 31 so as to be focused there. To this end, it is necessary to move the projecting lens 43 before and behind by an actuator 42 to provide the focused light.

Signals for this focusing are produced as follows. The reflected light from the optical disk passes the ¼ wavelength plate 41 through the projecting lens 43 in the direction opposite to the direction mentioned above. Then, the reflected laser light flux is converted from the circular-polarized light to the linear-polarized light which is incident on the polarized beam splitter 40. The direction of the linear polarization, however, is opposite to the above case so that the light flux cannot pass the polarized-light beam splitter 40 but is vertically reflected, passes lenses 44, 45 and is incident on a four-division sensor 46. The light flux incident on the four-division sensor 46 has different shapes according to the degree of out-of-focus of the light spot irradiated onto the optical disk 31 so that the output signal from the four-division sensor 46 also varies according to the degree of out-of-focus. Then, this output signal is applied to an actuator driving signal production source 47 to produce a signal for actuating the actuator 42.

Figure 8:
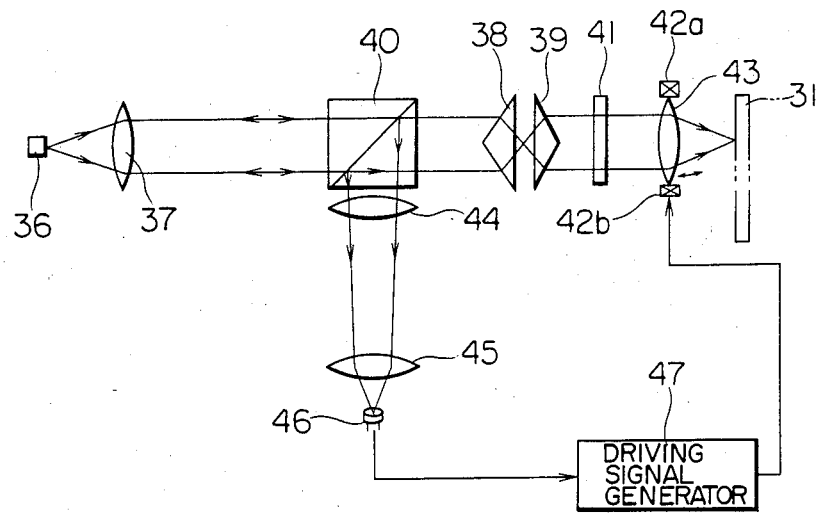

FIG. 8 shows another embodiment of this invention. This embodiment is different from the embodiment a shown in FIG. 7 in that the light flux dividing prism 38 and the light flux synthesizing prism 39 are placed between the polarized-light beam splitter 40 and the ¼ wavelength plate 41.

Figure 9:
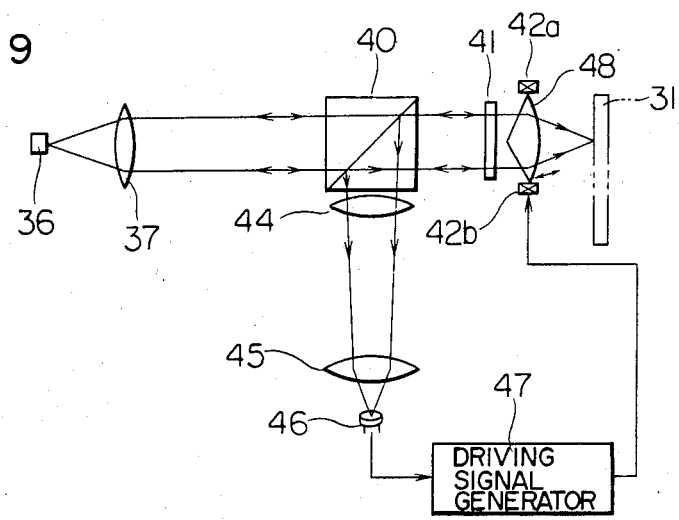

FIG. 9 shows still another embodiment of this invention. This embodiment is different from the embodiment as shown in FIG. 8 in that there is employed an optical component 48 with the light flux dividing prism 38, the light flux synthesizing prism 39 and the projecting prism 43 integrally formed.

Figure 10:
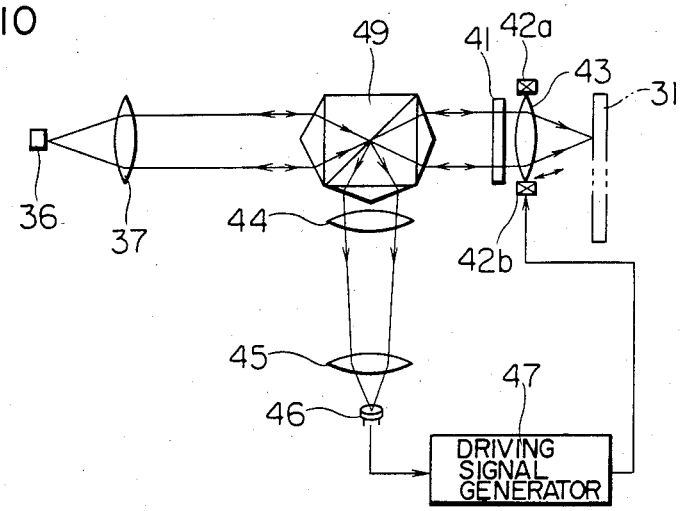

FIG. 10 shows still another embodiment of this invention. This embodiment is different from the embodiment as shown in FIG. 9 in that there is employed an optical component 49 with the polarized-light beam splitter 40, the light flux dividing prism 38 and the light flux synthesizing prism 39 integrally formed.

Figure 11:
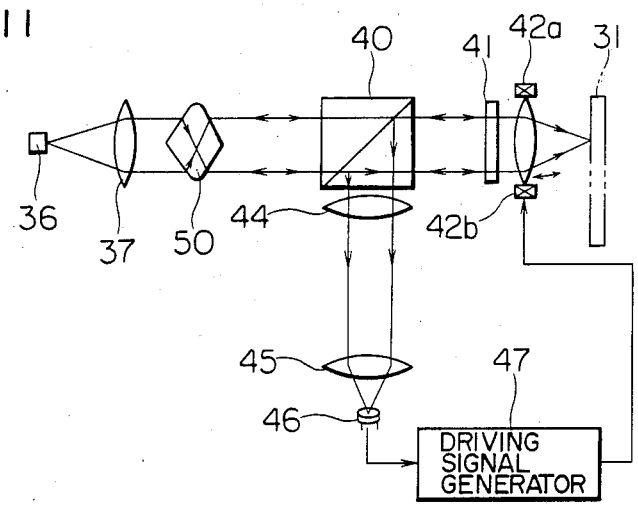

FIG. 11 shows yet a further embodiment of this invention. This embodiment is different from the embodiment as shown in FIG. 10 in that there is employed a light-flux dividing and synthesizing prism 50 with the light flux dividing prism 38 and the light flux synthesizing prism 39 integrally formed.

Figure 12:
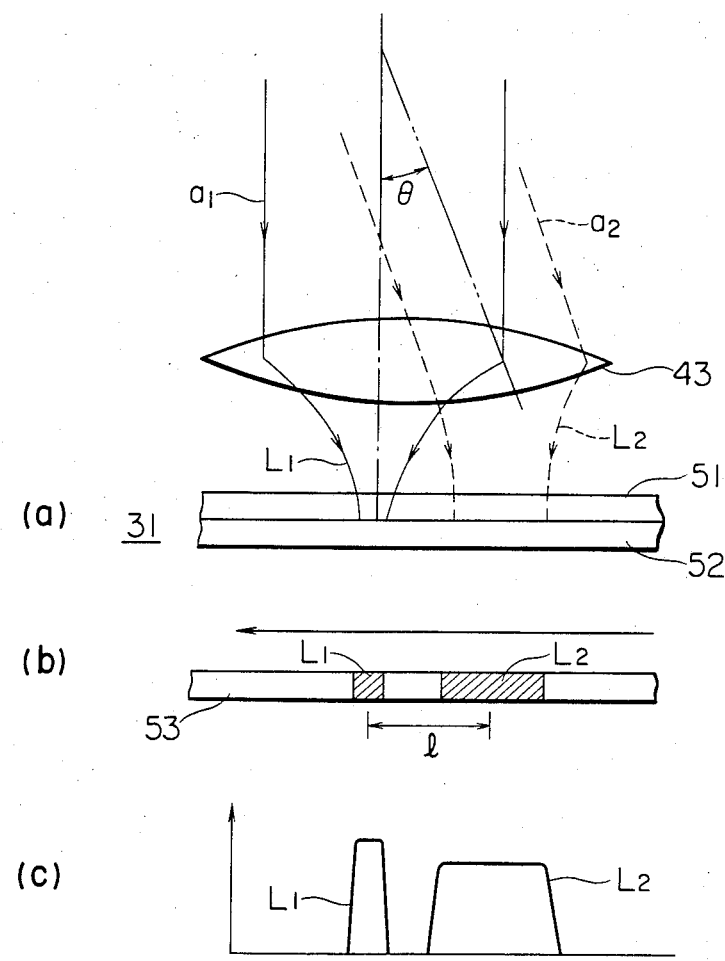
FIG. 12 (a) through (c) depicts a view for explaining how a minute spot light which is suitable to heat and abruptly cool a part of an optical recording medium and to heat and gradually cool it.

A still further embodiment of this invention will be explained below. FIG. 12 shows one embodiment of the minute spot light used in this invention which provides a condition of heating-and-abrupt cooling, and of heating-and-gradual cooling on an optical recording medium. FIG. 12 (a) is a side view showing how minute spot lights $L_1$ and $L_2$ of a substantially square and rectangular shape, respectively, converged from a laser light is irradiated onto a recording medium travelling leftwards as shown by an arrow; FIG. 12 (b) shows the irradiated spot lights on a track 53; and FIG. 12 (c) shows a temperature distribution at the parts of the recording thin film where the minute spot lights are irradiated, wherein the abscissa indicates a distance and the ordinate indicates the temperature of the recording thin film. In the figure, 52 designates a substrate on which the recording medium is formed and 51 designates a protection film.

When the recording thin film is locally irradiated with the minute spot light $L_1$ with the intensity strengthened, the pertinent part has an increasing temperature while it is irradiated and heated. After the irradiation of light is terminated, however, the generated heat is swiftly absorbed and diffused into the recording thin film, and the substrate and protection film adjacent thereto, thus establishing a condition of abrupt cooling.

On the other hand, when the recording thin film is locally irradiated with the minute spot light $L_2$ of a rectangular shape, longitudinally converged in the travelling direction of the recording medium, a temperature distribution more extended in the travelling direction than in the spot light $L_1$ is provided as shown in FIG. 12 (c) so that the time while the pertinent part is heated is lengthened, and the part is more gradually cooled than in the spot light $L_1$.

Thus, if the minute spot light $L_1$ with a substantially square shape is locally irradiated onto the travelling recording thin film and its intensity is changed with time according to the information to be written, the condition of heating-and-abruptly cooling is established on the pertinent part so that pits can be written. On the other hand, if the minute spot light $L_2$ with a rectangular shape extended in the travelling direction is locally irradiated onto the travelling recording thin film and its intensity is changed, the condition of heating-and-gradually cooling is established so that the pits written can be erased. Incidentally, a reproduction signal is provided by the above substantially square minute spot light $L_1$.

Both the substantially square minute spot light $L_1$ and rectangular minute spot light $L_2$ are formed by a convergence lens 43. More specifically, if both laser beams, $a_1$ of a substantially square shape and $a_2$ of a rectangular shape extended in the direction of the track 53, are irradiated within an effective diameter (aperture) of the convergence lens 43 and their optical axes are set to be not parallel, both the substantially square minute spot light $L_1$ and rectangular minute spot light $L_2$ with a distance apart from each other at their center are provided. This distance l is determined by an angle $\theta$ formed by the above optical axes along the travelling direction of the recording medium, and the smaller $\theta$ provides the smaller l so that the minute spot lights $L_1$ and $L_2$ approach each other.

Figure 13:
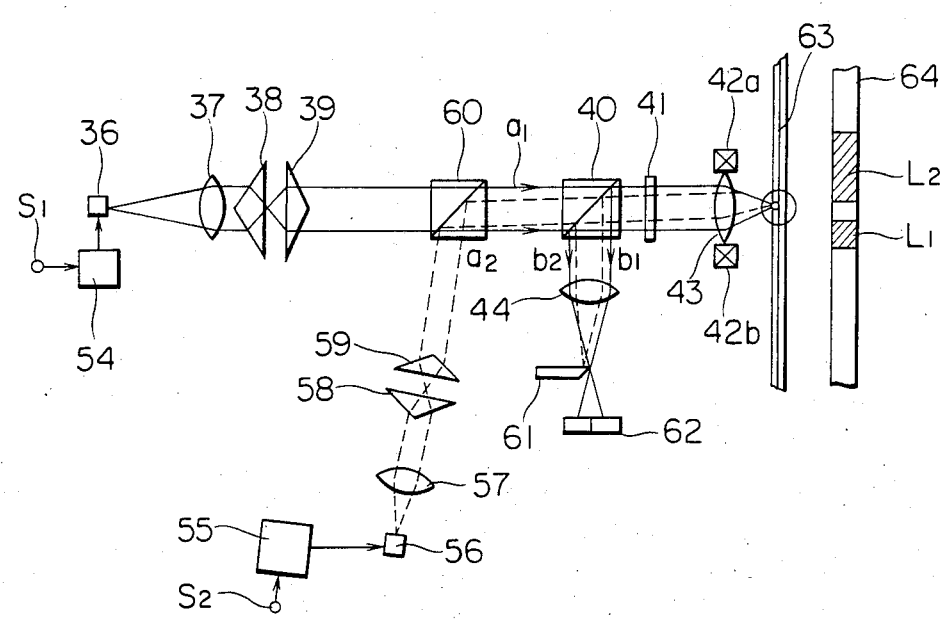
FIG. 13 is a view showing a further embodiment of this invention.

FIG. 13 shows a further embodiment of this invention. In this figure, 36 denotes a semiconductor laser having substantially equal light beam spreading angles in a horizonal direction and vertical direction for its light emitting surface; and 37 denotes a light collecting lens which collects the light beam from the semiconductor laser 36 to provide a substantially circular parallel light beam that is incident on a quadrangular pyramid prism 38. This prism 38 divides the substantially circular laser beam into four light flux portions that are incident on a prism 39. The prism 39 superposes or synthesizes the four light flux portions to provide an even light intensity distribution of the laser beam (In this figure, an optical path for dividing and synthesizing or superposition of the light flux is simplified). The synthesized laser beam passes a beam splitter (half prism) 60, a polarized-light beam splitter 40 and a λ/4 plate 41 and is incident on a projecting lens 43. This projecting lens 43 converges the incident square light beam $a_1$ to provide a substantially square minute spot light $L_1$ on a guide track 64 as shown in FIG. 13.

Numeral 42 denotes an actuator for driving the projecting lens 43, which actuator drives the projecting lens 43 in a direction vertical to an optical disk in accordance with the plane movement of the optical disk to perform a known focusing control, and drives it in a direction vertical to the guide track 64 to perform a tracking control for the guide track 64 having eccentricity. If desired, the actuator 42 also drives the projecting lens 43 in a direction of the tangential lens 43 in a direction of the tangential line of the guide track to perform a time axis correction control. Numeral 56 denotes a semiconductor laser having a larger light beam spreading angle in a vertical direction for the light emitting plane than in a horizonal direction therefor; and 57 denotes a light collecting lens which collects the light beams to provide a substantially parallel light beam. This substantially parallel light beam passes quadrangular pyramid prisms 58, 59, is divided and synthesized to provide a light beam $a_2$ having an even light intensity distribution. This light beam $a_2$ is reflected at the beam splitter 60, travels on the optical path substantially the same as that of the light beam $a_1$, and is incident on the projecting lens 43. Thus, a minute spot light $L_2$ having a rectangular shape and a longitudinal direction coincident with the direction of the track is formed on the track which is irradiated with the minute spot light $L_1$.

The light beam reflected at the optical disk is incident on the polarized-light beam splitter via the projecting lens 43 and the $\lambda/4$ plate 41. Since the light beam has passed on the $\lambda/4$ plate twice at the incidence and refection, it rotates 90° in its polarization and is now reflected at the polarized-light beam splitter 40.

Numeral 44 denotes a single lens which converts reflected light beams $b_1$ and $b_2$ into a converged light. 61 denotes a knife edge which is arranged in the neighborhood of the focusing positions of the reflected light beams $b_1$ and $b_2$ so as to intercept only the reflected light beam $b_2$ from the semiconductor laser 56. Numeral 62 denotes a light detector separated into four parts, for example, which gives control signals for focus control and tracking control and reproduced signals in the known manner. Numerals 54 and 55 denote driving circuits for driving the semiconductor lasers 36 and 56, respectively which are intensity-modulated in accordance with input signals $S_1$ and $S_2$.

The arrangement of FIG. 13 provides two light spots placed in proximity to each other on the same guide track, i.e., one having a substantially square shape and the other having a rectangular shape extented in the longitudinal direction of the guide track; these light spots, tracking on the guide track on the optical recording disk, permit to individually establish both conditions of heating-and-abrupt cooling and heating-and-gradual cooling.

In FIG. 13, both light beams are irradiated in the following manner. FIG. 13 shows the state where the focus control has beam initiated or "pulled-in". In this state, the reflected lights $b_1$ and $b_2$ can be separated from each other by the knife edge 61 since they are focused on different positions. Unless the focus control is not initiated or "pulled-in", however, the reflected lights $b_1$ and $b_2$ to be focused by the lens 44 are not focused in the neighborhood of the knife edge 61. This causes the reflected light $b_2$ to be irradiated onto the light detector 62, which influences so badly on the focus control pull-in operation as not to permit its stabilized "pulled-in" operation. Also even after the focus control is initiated, the drifting light of the reflected light $b_2$ may enter the light detector 62, which exerts bad influence on the focus control. In such reasons, at least until the focus control is initiated, or while reproduced signals are being fetched from the optical disk, light is not emitted from the semiconductor laser 56 for providing the rectangular minute spot light $L_2$, and so the light beam $a_2$ is not irradiated.

As for the distance between the minute spot lights $L_1$ and $L_2$, they can be approached each other so near as to be thermally influenced from each other since they are formed by the same convergence lens. Therefore, the irradiation of both minute spot lights $L_1$ and $L_2$ at the time of heating-and-gradual cooling as shown in FIG. 14 (a) provides a longer temperature distribution in the travelling direction of the track, enhancing the effect of gradual cooling.

Figure 14:
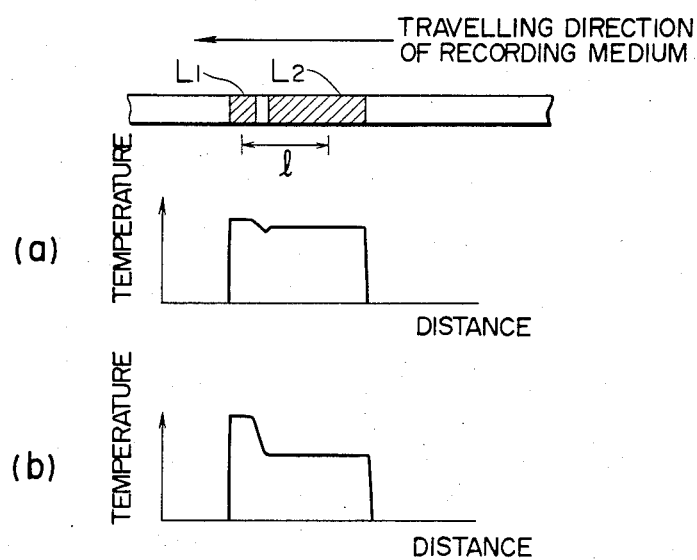
FIG. 14 (a) and (b) depicts a graph showing temperature distributions on a recording medium, respectively.

Also when both minute light spots $L_1$ and $L_2$ are irradiated with the intensity of $L_2$ weakened at the time of heating-and-abrupt cooling as shown in FIG. 14 (b), the minute light spot $L_2$ provides two advantageous effects: of preheating which reduces the light intensity of $L_1$ required for recording, and of stabilizing the recording condition by once performing the complete erasing to place the recording material in an entirely uniform crystal state for example. Incidentally, the light intensity of each minute spot is set at an optimum value in accordance with the recording erasing or reproducing condition, which is obtained by the intensity-modulating by the semiconductor laser driving devices 54 and 55.

As for the time sequence of providing both minute spots $L_1$ and $L_2$, when $L_2$ precedes $L_1$, the recording can be performed while the erasing is being performed. And when $L_1$ precedes $L_2$, the section to be erased can be determined by the signals reproduced using $L_1$ and so $L_2$ can be irradiated onto the section.

In accordance with this invention, there is provided an even light intensity contribution of the light spot irradiated onto an optical recording medium so that an even temperature distribution of the recording medium is also provided, enabling to perform a reversible change of the optical characteristics thereof at a high speed. Therefore, this invention provides an advantageous effect of real-time erasing, recording and reproducing.

We claim:

1. An optical head for an optical disc of an optical disc device in which signals are recorded and erased on a recording thin film on an optical disc plane as changes in a reflection factor or transmission factor of a light beam irradiating the recording thin film of the optical disc as a minute light spot using the state transition depending upon the difference in the heating-and-cooling cycle in the recording thin film, the optical disc being moved relative to the minute light spot, the optical head comprising means for forming the minute light spot including light source means providing a light beam with a Gaussian light intensity distribution, and means provided in the optical path between the light source means and the recording thin film for converting the Gaussian light intensity distribution of the light beam into a non-Gaussian light intensity distribution for enabling irradiation of the recording thin film with the non-Gaussian light intensity distribution and thereby enabling control of the temperature distribution in the minute light spot on the recording thin film so as to enable erasing and recording of signals on the recording thin film at high speed, the Gaussian light intensity distribution means including at least one light beam dividing prism for dividing the light beam with a Gaussian light intensity distribution into a plurality of light beam parts and at least one light beam synthesizing prism for synthesizing the plurality of light beam parts to provide a light beam with a non-Gaussian light intensity distribution for irradiation of the recording thin film, the light beam with the Gaussian light intensity distribution being parallel light and being extracted from said at least one light beam dividing prism and synthesizing prism as parallel light with the non-Gaussian light intensity distribution which is a substantially flat light intensity distribution.

2. An optical head according to claim 1, wherein the light source means provides a light beam having a width sufficient to be irradiated onto an area containing an apex of the light beam dividing prism.

3. An optical head according to claim 2, wherein the light beam dividing prism is a prism enabling dividing of the light beam into minute light beam parts having equal areas, respectively.

4. An optical head according to claim 2, wherein the light beam dividing prism is a triangular prism.

5. An optical head according to claim 2, wherein the light beam dividing prism is a pyramid prism.

6. An optical head according to claim 2, wherein the light beam dividing prism is a cone prism.

7. An optical head according to claim 2, wherein the light beam dividing prism is an elliptical cone prism.

8. An optical head according to claim 2, wherein the light beam dividing prism is a polyangular prism.

9. An optical head according to claim 1, wherein the light beam dividing prism and the light beam synthesizing prism are integral prisms.

10. An optical head according to claim 1, wherein the Gaussian light intensity distribution converting means further includes at least one optical component and at least one of the light beam dividing prism and the light beam synthesizing prism is integral with the at least one optical component.

11. An optical head according to claim 1, wherein the Gaussian light intensity distribution converting means further includes at least one optical component for enabling irradiation of the recording thin film with the non-Gaussian intensity distribution.

12. An optical head according to claim 1, wherein the Gaussian light intensity distribution converting means includes a first light beam dividing prism having an area containing an apex and a first light beam synthesizing prism, and a second light beam dividing prism having an area containing an apex and a second light beam synthesizing prism, the light source means includes a first light source for providing light for irradiating the area containing the apex of the first light beam dividing prism so that light passing through the first light beam dividing prism and the first light beam synthesizing prism provides a non-Gaussian light intensity distribution, the light source means further including a second light source for providing light for irradiating the area containing the apex of the second light beam dividing prism so that light passing through the second light beam dividing prism and the second light beam synthesizing prism provides a non-Gaussian light intensity distribution, and condenser lens means for receiving light from the first and second light beam synthesizing prisms and enabling the light from the first light beam synthesizing prism to be irradiated on the recording thin film as a minute light spot having a substantially square shape and the light from the second light beam synthesizing prism to be irradiated onto the recording thin film as another minute light spot having a rectangular shape extended in the moving direction of the optical disc.

13. An optical head according to claim 12, wherein the minute light spot of substantially square shape irradiates the recording thin film for recording information signals thereon and at least the another minute light spot having the rectangular shape irradiates the recording thin film for erasing the information signals therefrom.

14. An optical head according to claim 13, wherein the light from the first and second light beam dividing prisms is incident on the condenser lens means at different incident angles.

15. An optical head according to claim 1, wherein the light source means includes at least one laser light source.

16. An optical head according to claim 1, wherein the at least one light beam synthesizing prism is a non light beam dividing prism.

* * * * *